March 29, 1949.   C. F. VOYTECH   2,465,499
DIAPHRAGM TYPE MECHANICAL SEAL
Filed Oct. 17, 1946
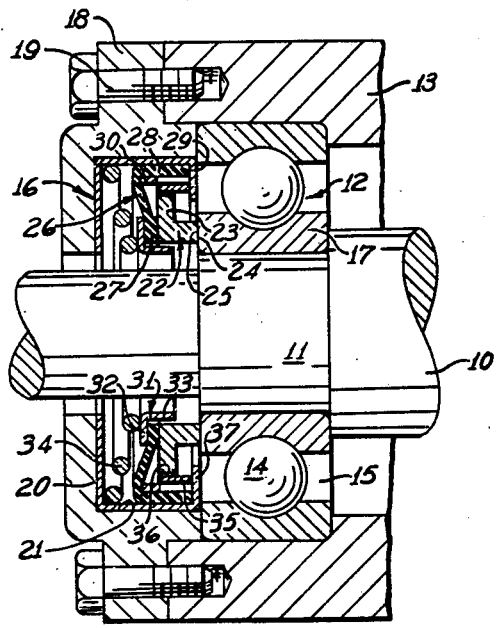
Fig.1.
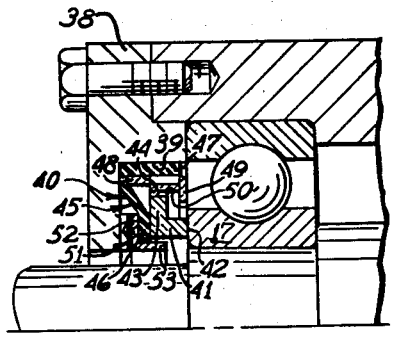
Fig.2.
Fig.4.
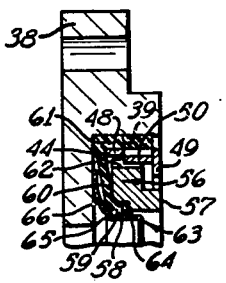
Fig.3.
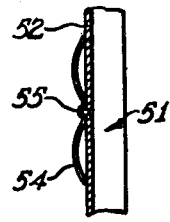
Fig.5.
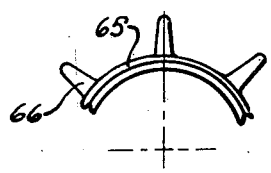
INVENTOR.
Charles F. Voytech
BY Patented Mar. 29, 1949

2,465,499

UNITED STATES PATENT OFFICE 2,465,499

DIAPHRAGM-TYPE MECHANICAL SEAL

Charles F. Voytech, Chicago, Ill., assignor to Crane Packing Company, Chicago, Ill., a corporation of Illinois Application October 17, 1946, Serial No. 703,817

1 Claim. (Cl. 286—11)

This invention relates to rotary seals of the mechanical type and particularly to such seals which are adapted to fit into a small space as for example oil and grease closures.

The principal object of this invention is to provide a rotary mechanical seal for use as an oil or grease retainer or similar purpose, said seal being unitary in construction so as to be readily handled as a single unit, and being adapted to fit into the same space as the more commonly used seals designed for the same purpose.

Another object of this invention is to provide a seal which does not utilize an outer rigid retainer to hold the parts thereof together and to provide a press-fitted support in a housing or the like, said seal being constructed as a self-contained unit and providing a direct rubber-to-metal seal. As a feature of this invention the tolerance and finish of the metal part into which the seal is to be pressed need not be held to such close limits as when a metal retainer is used, since slight variations in dimensions can be taken up by the natural resilience of the rubber.

These and other objects and features of this invention will become apparent from the following detailed description when taken together with the accompanying drawings, in which Fig. 1 is a section taken through a fragment of an apparatus in which the seal of this invention is installed;

Fig. 2 is a modification of the seal of Fig. 1 which eliminates the retainer;

Fig. 3 is a development of a spring used in the seal of Fig. 2;

Fig. 4 is a second modification of the seal of Fig. 1 in which a different type of spring is used; and Fig. 5 is a fragmentary elevation of the spring used in the seal of Fig. 4.

Referring now to the drawings for a detailed description of this invention and particularly to Fig. 1, there is shown a shaft 10 having a step 11 upon which is mounted a ball bearing 12 the outer race of which is supported from a housing 13. Balls 14 of bearing 12 are supplied with a lubricant through space 15 between the inner and outer races of the bearing. The lubricant, unless sealed in some suitable fashion, will tend to pass through the bearing from the right-hand side, as viewed in Fig. 1, to the left and out of housing 13. To prevent this unwanted passage of lubricant a seal 16 is used, said seal closing off the space between the inner race 17 of bearing 12 and the closure-plate 18 which is secured by bolts 19 to housing 13 with a fluid-tight fit.

Seal 16 is comprised of a rigid L-shaped retainer 20 which is press-fitted into a similarly shaped recess 21 in closure-plate 18. Retainer 20 is preferably made of brass but it can be made of other materials including some of the synthetic resins. Within retainer 20 is positioned a washer 22 having a flange 23 extending radially outwardly and a radially disposed surface 24 which has been ground and lapped so as to form a perfect fluid-tight joint with the similarly finished radial face 25 of inner race 17.

Washer 22 is sealed with respect to retainer 20 by a flexible resilient deformable diaphragm 26 which is provided at its inner periphery with a flange 27 abutting on the back of washer 22 and on its outer periphery with an axially extending flange 28 compressed against the inner cylindrical wall 29 of retainer 20 by a rigid band 30. The outside diameter of flange 28 is preferably made slightly larger than the diameter of wall 29 and similarly the inside diameter of flange 28 is made slightly smaller than the outside diameter of band 30 such that flange 28 will be in compression when assembled with respect to retainer 20 and band 30. In this manner a fluid-tight seal is effected between diaphragm 26 and retainer 20. In order to effect a fluid-tight seal between flange 27 and the back of washer 22 a ferrule 31 of L-shaped cross-section having a radially disposed leg 32 and an axially disposed leg 33, radially disposed leg 32 abutting on the back of flange 27 and being pressed thereagainst by a conical spring 34, one end of spring 34 being retained in the corner of retainer 20 and the other end of the spring abutting on radial leg 32 of ferrule 31. Said ferrule 31 serves to equalize the spring pressure around the periphery of flange 27 and leg 33 of ferrule 31 serves to center said ferrule with respect to the washer.

In order to remove all torque from diaphragm 27 which may be impressed thereon by the friction between washer 22 and race 17, band 30 is formed with a plurality of lugs 35 which extend radially inwardly into similarly formed notches or grooves 36 in the outer periphery of flange 23 on washer 22. Thus washer 22 may move axially relative to band 30 and retainer 20, but it is restrained from rotating relative thereto by the lug-and-slot connection.

It is preferred that the entire seal 16 be assembled at the seal manufacturer's establishment and thereafter shipped and handled and installed as a single unit. To this end retainer 20 has its forward edge 37 rolled or otherwise formed radially inwardly to a diameter which is less than the outside diameter of flange 23 on washer 22. This is done after all of the elements of the seal have been assembled within retainer 20 and when the rolling is completed washer 23 may be urged by spring 34 to the right as viewed in Fig. 1 until flange 23 strikes edge 37, but the washer cannot move beyond this point. The entire seal may then be handled as a unit, with rolled-in edge 37 serving as a means by which the retainer may be pressed into closure-plate 18.

It will be noted in the Fig. 1 form that a retainer must be used to hold the entire seal together as a single unit and that the retainer must be rolled or spun radially inwardly at the forward edge after all of the elements of the seal have been assembled. It will also be noted that the outside diameter of retainer 20 and the cylindrical wall 21 of the recess in which seal 16 is pressed must be finished off and held to relatively close tolerances. These two operations of course are expensive and are warranted only where the finest equipment is desired. For a less expensive seal for the same purpose, reference is now made to Fig. 2. In this form it will be observed that the closure-plate 38 resembles very closely closure-plate 18 of Fig. 1 and is similarly formed with a recess 39 in which is retained a seal 40. Said seal is comprised of a washer 41 having a radially disposed surface 42 which is suitably ground and finished to operate with a fluid-tight fit against the inner race 17 of ball bearing 12. Said washer 41 is provided with a radially extending flange 43 having one or more axially extending slots 44 in the outer periphery thereof. Washer 41 is sealed with respect to closure-plate 38 by means of a diaphragm 45, said diaphragm having a radially disposed flange 46 at the inner periphery thereof and an axially disposed flange 47 at its outer periphery. No retainer is used and flange 47 is therefore compressed directly against the cylindrical wall of recess 39 by a rigid band 48. Said band 48 has a radially inwardly disposed flange 49 at the right-hand end thereof as viewed in Fig. 2, and adjacent said flange are formed one or more lugs 50 which project radially inwardly into the grooves 44 in washer 41. The outer periphery of flange 47 on diaphragm 45 is made slightly larger than the diameter of recess 39 and the outer diameter of band 48 is made slightly larger than the internal diameter of flange 47 such that when the device is assembled with respect to closure-plate 38 a fluid-tight seal will be effected between the plate and diaphragm 45.

Flange 46 of diaphragm 45 abuts on the back of washer 41. A ferrule 51 having a radially disposed leg 52 and an axially disposed leg 53 is positioned behind flange 46 with leg 52 abutting on flange 46. The outside diameter of axially extending leg 53 is made to have a close fit with flange 46 but a slight clearance is left between leg 53 and the opening in washer 41 into which leg 53 extends. The clearance just mentioned permits ferrule 51 to move axially relative to washer 41 to compress flange 46 against the back of washer 41 to effect a fluid-tight seal thereat. The necessary sealing pressure is derived from a suitable spring which is compressed between closure-plate 38 and leg 52 of ferrule 51. One such spring is shown at Fig. 3 and is comprised of thin flexible resilient spring elements 54 having a developed contour such as that shown and secured either by means of rivets 55 or by a tackweld to leg 52. Springs 54 are so designed that when the seal is installed as shown in Fig. 2 the requisite amount of spring pressure will be available to hold washer 41 against race 17.

The seal shown in Fig. 2 is readily assembled at the factory by first assembling a washer 41 relative to a band 48 with grooves 44 aligned with lugs 50 and band 48 is then pressed into flange 47. Due to the fact that band 48 is slightly oversize it will be held frictionally in flange 47 under all ordinary handling circumstances and conditions. Next, a ferrule 51 with springs 54 attached thereto is compressed against flange 46 on diaphragm 45 and again, due to the difference in size between the leg 53 and internal diameter of flange 46, a press-fit will be secured which will hold the ferrule on flange 46 under all ordinary conditions. When the seal is to be installed in a closure-plate 38, pressure is applied to flange 49 on band 48 until it becomes apparent that diaphragm 45 and particularly flange 47 thereof bottoms on recess 39. The last fraction of an inch of movement into recess 39 will be effective against the resistance of spring 54 which will become preloaded when the seal is properly disposed relative to inner race 17.

Thus in the Fig. 2 form the outer diameter of flange 47 can be held fairly closely in the mold by which diaphragm 45 is formed and the diameter of recess 39 need not be held to extremely close tolerances or fine finish since the resilient deformable rubber or the like from which diaphragm 45 is made will readily be compressed and deformed to take the shape of the wall of the recess. The retainer has been dispensed with and since spring 54 is not in compression when the seal is assembled by the manufacturer, no provision need be made for retaining the washer against the action of the spring. Since the retainer has been dispensed with, a relatively large part of the cost of the seal has likewise been eliminated with the result that the Fig. 2 form of seal is inexpensive and yet to all intents and purposes is a self-contained, efficient seal.

In some instances it might be desirable to dispense with the use of separate springs secured to a ferrule and to use instead a combination ferrule and spring. Such a seal is shown in Figs. 4 and 5. The closure-plate is identical with plate 38 of Fig. 2 and is similarly numbered. Likewise the recess 39 is of the same size as the corresponding recess in Fig. 2 and an identical clamping band 48 may be used, the band having an inwardly disposed flange 49 at one end and, adjacent thereto, one or more lugs 50 extending radially inwardly into grooves 44 in the outer periphery of a sealing washer which is designated 56 since it is of slightly different cross-section than washer 41. Said washer 56 has a radially disposed sealing surface 57 and an angular recess 58 in the lower left-hand corner thereof as shown in Fig. 4. Within said recess is disposed an axially extending flange 59 which is an integral part of a sealing diaphragm 60 having another axially extending flange 61 at the outer periphery thereof. Diaphragm 60 is of slightly different contour from the diaphragm of Fig. 2 and a small space 62 is provided between diaphragms 60 and closure-plate 38. Inner axial flange 59 is compressed into recess 58 by a combination ferrule and spring 63, said ferrule having an axially extending cylindrical portion 64 the outside diameter of which is slightly greater than the internal diameter of flange 59, a shoulder 65 which abuts the back of flange 59 and a plurality of finger-type springs 66 formed integrally with the ferrule 63 and being bent substantially as shown in Fig. 4 so that the ends thereof react against closure-plate 38. Under compression the ends of finger 66 will slide radially outwardly into the space 62 previously mentioned.

It will be apparent that the form shown in Figs. 4 and 5 can be assembled at the seal manufacturer's establishment and handled and installed as a unit in the same manner as the Fig. 2 form. Where large quantity production is possible, the Fig. 4 form may be less expensive since it is not necessary to form the ferrule and springs separately and then to assemble them as in the Fig. 2 form.

In all of the forms shown the diaphragm has no reentrant curves and hence can be formed in a two-part mold which is the simplest and least expensive type of mold to make. All three forms may be made short axially and hence are adapted to fit into the spaces usually provided for oil and grease seals. All three forms likewise are adapted to seal on a vertical face rather than upon the shaft itself and hence possess all of the advantages of this general type of seal.

The adaptation of a diaphragm type of sealing element to a shaft seal, with a clamping band for the sealing element utilized to drive the sealing washer is disclosed and claimed in my prior application, S. N. 617,467, filed September 20, 1945.

It is understood that the foregoing description is illustrative of preferred embodiments of this invention and that the scope of the invention is not to be limited thereto, but is to be determined by the appended claim.

What is claimed is:

A mechanical seal for relatively rotatable elements comprising a sealing washer, a diaphragm of flexible resilient deformable material having a flange at the inner periphery thereof abutting on the washer, an axially extending flange at the outer periphery of the diaphragm, a rigid band supported solely by the last-mentioned axially extending flange and adapted to exert a radially outward compressive force against the flange when the seal is installed, said band having a portion telescoped over the washer and having also a radially inwardly turned flange extending into the path of movement of the washer for limiting axial movement of the washer out of the band, means on the band for preventing relative rotation between the band and washer, and means carried by the inner flange and adapted to transmit an axial pressure upon the washer.

CHARLES F. VOYTECH.

REFERENCES CITED

The following references are of record in the file of this patent:

UNITED STATES PATENTS

| Number | Name | Date |
| --- | --- | --- |
| 2,308,114 | Schjolin | Jan. 12, 1943 |
| 2,347,118 | Matter | Apr. 18, 1944 |
| 2,377,452 | Reynolds | June 5, 1945 |

FOREIGN PATENTS

| Number | Country | Date |
| --- | --- | --- |
| 874,519 | France | 1942 |